United States Patent
Mills et al.

(10) Patent No.: US 9,195,409 B2
(45) Date of Patent: Nov. 24, 2015

(54) STORAGE SYSTEM WITH LOAD BALANCING MECHANISM AND METHOD OF OPERATION THEREOF

(71) Applicant: Enmotus Inc., Aliso Viejo, CA (US)

(72) Inventors: Andrew Mills, Coto de Caza, CA (US); Marshall Lee, Newport Coast, CA (US)

(73) Assignee: ENMOTUS, INC., Aliso Viejo, CA (US)

( * ) Notice: Subject to any disclaimer, the term of this patent is extended or adjusted under 35 U.S.C. 154(b) by 284 days.

(21) Appl. No.: 13/872,389

(22) Filed: Apr. 29, 2013

(65) Prior Publication Data

US 2013/0297869 A1   Nov. 7, 2013

Related U.S. Application Data (60) Provisional application No. 61/641,191, filed on May 1, 2012.

(51) Int. Cl.
  *G06F 12/00* (2006.01)
  *G06F 3/06* (2006.01)

(52) U.S. Cl.
  CPC .............. *G06F 3/0674* (2013.01); *G06F 3/061* (2013.01); *G06F 3/068* (2013.01); *G06F 3/0649* (2013.01)

(58) Field of Classification Search
  CPC ..... G06F 3/0674; G06F 3/068; G06F 3/0649; G06F 3/061
  See application file for complete search history.

(56) References Cited

U.S. PATENT DOCUMENTS

| | | |
|---|---|---|
| 5,247,660 A | 9/1993 | Ashcraft et al. |
| 5,347,540 A | 9/1994 | Karrick |
| 5,394,531 A | 2/1995 | Smith |
| 6,836,819 B2 | 12/2004 | Kano et al. |
| 8,463,825 B1 | 6/2013 | Harty et al. |
| 2006/0036825 A1* | 2/2006 | Maki et al. ............... 711/165 |
| 2007/0233868 A1 | 10/2007 | Tyrrell et al. |
| 2008/0141264 A1 | 6/2008 | Johnson |
| 2009/0113156 A1* | 4/2009 | Fujita et al. ............... 711/165 |
| 2010/0250748 A1* | 9/2010 | Sivasubramanian et al. . 709/226 |
| 2010/0299489 A1 | 11/2010 | Balachandriah et al. |
| 2011/0185120 A1 | 7/2011 | Jess |
| 2011/0197046 A1 | 8/2011 | Chiu et al. |
| 2012/0110263 A1* | 5/2012 | Fujita et al. ............... 711/114 |

FOREIGN PATENT DOCUMENTS

EP    2026191 A3    1/2012

OTHER PUBLICATIONS

International Search Report for Application No. PCT/US2013/038790 dated Oct. 22, 2013.

* cited by examiner

*Primary Examiner* — John Lane
(74) *Attorney, Agent, or Firm* — IP Investment Law Group (57) ABSTRACT

A method of operation of a storage system includes: establishing a first virtual disk volume including allocating a first portion and a first low performance storage capacity; generating a usage statistics for the first virtual disk volume; and calculating a first trend line for adjusting the first portion and the first low performance storage capacity based on the usage statistics.

25 Claims, 8 Drawing Sheets

STORAGE SYSTEM WITH LOAD BALANCING MECHANISM AND METHOD OF OPERATION THEREOF

CROSS-REFERENCE TO RELATED APPLICATION(S)

This application claims the benefit of U.S. Provisional Patent Application Ser. No. 61/641,191 filed May 1, 2012, and the subject matter thereof is incorporated herein by reference thereto.

TECHNICAL FIELD

An embodiment of the present invention relates generally to a storage system, and more particularly to a storage system having multiple tiers of storage media having different performance capabilities.

BACKGROUND

Storage domains that can include support for a plurality of host computers are often stored in a single storage array. The storage array provides redundancy to the host computer domains, by a plurality of magnetic disk devices in a system, thereby increasing reliability and providing a necessary storage domain as a logical volume to the plurality of host computers. One of the merits of using this storage array is availability of the logical volume.

When one of the plurality of host computers has used up a logical volume provided by the storage array, a system administrator can allocate free space within the storage array as an addition to the logical volume in use, thereby expanding the storage domain. The additional volume expansion can correspond to data volume increasing over time in order to expand the operation time of an application using the data volume.

The intervention of the system administrator can be managed in a small data center environment. With the advent of regional data sharing and multi-site data domains, it can be difficult for the system administrator to keep the plurality of host computers from consuming their allocated logical volumes. Moreover, in order to enhance the utilization of a storage array, it can be necessary to provide logical volumes to a plurality of users in a single storage device without wasting capacity.

Thus, a need still remains for a storage system with load balancing mechanism to improve performance and accessibility of user data. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a storage system including: establishing a first virtual disk volume including allocating a first portion and a first low performance storage capacity; generating a usage statistics for the first virtual disk volume; and calculating a first trend line for adjusting the first portion and the first low performance storage capacity based on the usage statistics.

An embodiment of the present invention provides a method of operation of a storage system including: establishing a first virtual disk volume including allocating a first portion in a tier zero storage and a first low performance storage capacity in a tier one storage; generating a usage statistics for the first virtual disk volume including monitoring a media interface bus; and calculating a first trend line for adjusting the first portion and the first low performance storage capacity based on the usage statistics includes restricting, by a partition fluidity control module, a magnitude of the first trend line.

An embodiment of the present invention provides a storage system, including: a tier zero storage; a first portion allocated from the tier zero storage; a tier one storage joined with the tier zero storage for forming a first virtual disk volume including the first portion and a first low performance storage capacity; a data mover module coupled to the tier zero storage and the tier one storage for generating a usage statistics for the first virtual disk volume; and a target allocation estimator module coupled to the data mover module for calculating a first trend line and adjusting the first portion and the first low performance storage capacity based on the usage statistics.

An embodiment of the present invention provides a non-transitory computer readable media including: establishing a first virtual disk volume including allocating a first portion and a first low performance storage capacity; generating a usage statistics for the first virtual disk volume; and calculating a first trend line for adjusting the first portion and the first low performance storage capacity based on the usage statistics.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "tier" referred to herein is a group or array of storage media devices that have a common performance characteristic. The term "performance characteristic" referred to herein is a measure of data handling capability that can include any device operation and interface timing. Examples of the performance characteristic can include access time, data through-put, interface bandwidth, input-output operations per second (IOPS), endurance, data density, data reliability, and duration of retention of the data. The numerical value of a tier of storage, such as tier zero storage, tier one storage, or tier two storage, can be indicative of its relative performance with tier zero storage being the highest performance and tier two being the lowest performance. The tier zero storage can be formed of an array of a high performance storage device, capable of more than 1000 IOPS, while the tier one storage can be formed of an array of a low performance storage device capable of less than 200 IOPS.

The term "storage media device" referred to herein is an apparatus used for archiving and accessing of data in a computer system environment. For example, the storage media device can be a magnetic disk drive, a solid state disk drive, an optical disk drive, magnetic tape drive, or the like without regard to the interface attachment used.

The term "virtual storage" referred to herein is the total addressable memory available to a computer system that is composed of one or more memory devices, each of which represents a portion of the total addressable memory. The virtual storage is addressed by a virtual address that is translated to a physical address within the one or more memory devices.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
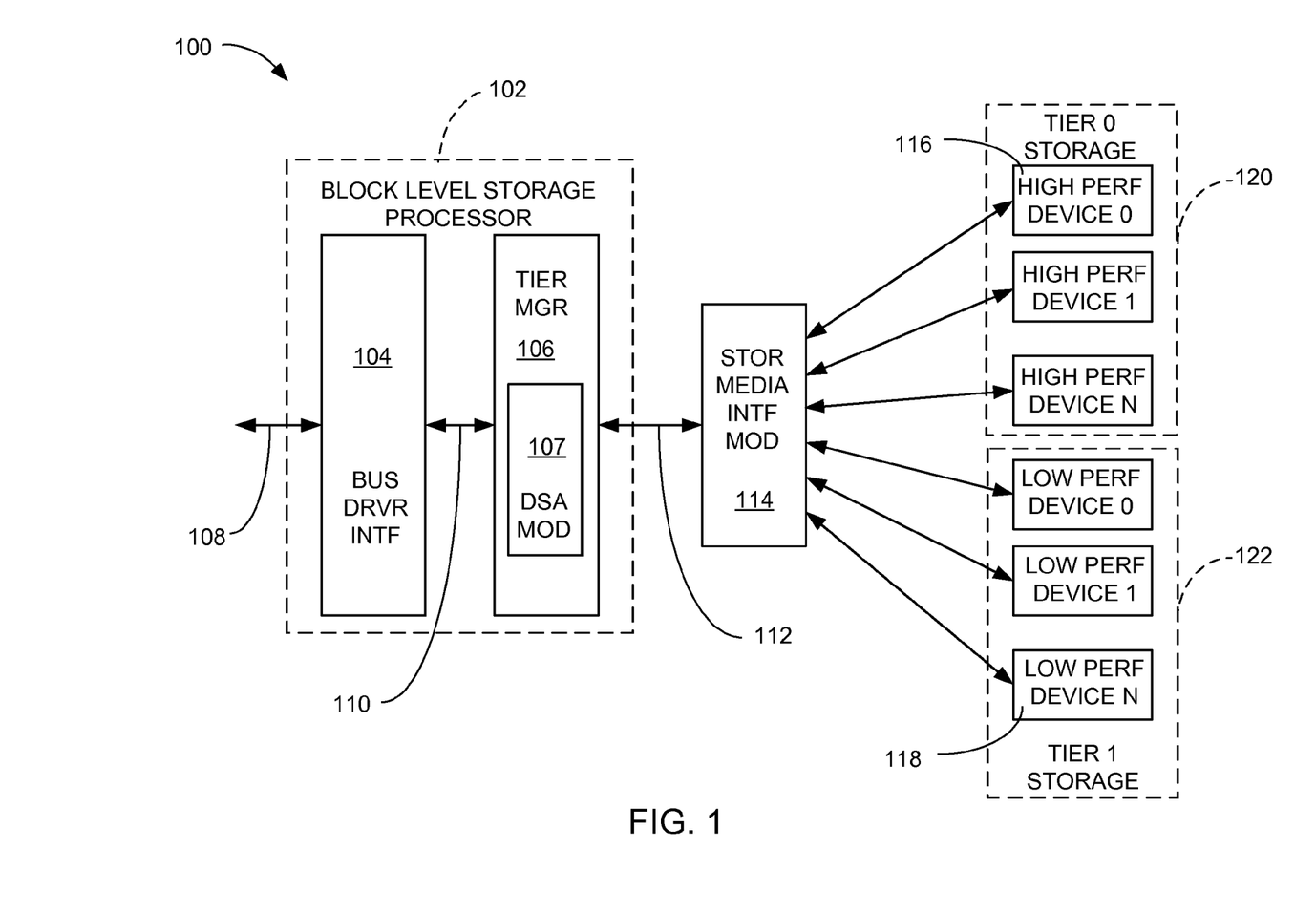
FIG. 1 is a block diagram of a storage system with load balancing mechanism in an embodiment of the present invention.

Referring now to FIG. 1, therein is shown a block diagram of a storage system 100 with load balancing mechanism in an embodiment of the present invention. The block diagram of the storage system 100 depicts a block level storage processor 102 including a bus driver interface module 104 and a storage tier manager 106. The storage tier manager 106 can be a processor or embedded processor configured to control the bus driver interface module 104 and manage the operations of the block level storage processor 102. The block level storage processor 102 can be implemented as instructions on a non-transitory computer readable medium (not shown) to be executed by a system processor (not shown). The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the system or installed as a removable portion of the system. The block level storage processor 102 can be implemented as a combination of flexible or dedicated hardware executing the instructions from the non-transitory computer readable medium or it can be implemented from dedicated hardware modules.

The bus driver interface module 104 can implement the protocol associated with communicating to a next level system (not shown). The block level storage processor 102 is capable of performing a variety of storage virtualization functions, including block level tiering, virtual-to-physical device mapping, usage statistics analysis, and other data management functions.

A dynamic storage allocation module 107 can provide an implementation mechanism for user specified limits or policies, which can provide dynamic allocation of the capacity of a virtual storage available to the next level system (not shown). The policies can also have specific parameters or configurations that are presets for specific application types such as databases, virtual machines or other data intensive applications and can regulate the operation of the dynamic storage allocation module 107. The dynamic storage allocation module 107 can be implemented within the storage tier manager 106 for providing the block level tiering, automated virtual capacity adjustment, and the virtual-to-physical table functions for one or more of the virtual disk volumes operated by the next level system (not shown).

An interface bus 108 can couple the bus driver interface module 104 to the next level system (not shown). The interface bus 108 can provide a bi-directional communication path between the storage system 100 and the next level system (not shown). The interface bus 108 can be a parallel bus, a serial bus, an electronic connection, an optical connection, or a wireless connection used to communicate with and deliver data to the block level storage processor 102. The bus driver interface module 104 can be coupled to the dynamic storage allocation module 107 by a data manager bus 110. The data manager bus 110 can receive or drive the data and interface exchanges to the interface bus 108.

A media interface bus 112 can couple the dynamic storage allocation module 107 to a storage media interface module 114. The media interface bus 112 can provide a communication path to allow transfer of blocks of data and set-up information between the dynamic storage allocation module 107 and the storage media interface module 114. The storage media interface module 114 can implement the communication protocol for a high performance storage device 116 and a low performance storage device 118.

The high performance storage device 116 can be identical to the low performance storage device 118, but more often they differ in terms of performance, capacity, cost, power consumption, and input-output operations per second (IOPS). The high performance storage device 116 can operate in excess of 1000 IOPS, while the low performance storage device 118 can operate at less than 200 IOPS. An array of the high performance storage device 116 can form a tier zero storage 120 and can include semiconductor based storage elements such as NAND flash based devices in the form of discrete components, standalone solid state disks (SSDs), or very high performance serial attached SCSI (SAS) disk drives operating at 10,000-15,000 rotations per minute (RPM). An alternate array of the low performance storage device 118, can form a tier one storage 122, such as serial advanced technology attach (SATA) or serial attached SCSI (SAS) drives operating at up to 7,200 RPM, network attached storage, or other slower forms of media.

A transfer of blocks of data through the block level storage processor 102 can be initially stored in either the tier zero storage 120 or the tier one storage 122. Any subsequent access of the blocks of data can be analyzed by the storage tier manager 106 as the usage statistics. The storage tier manager 106 can monitor the usage statistics to determine which of the blocks of data are most frequently accessed reads, reads and writes combined, streaming or random access characteristics, and the like.

If the storage tier manager 106 determines that any of the blocks of data are incorrectly located in the low performance storage device 118 due to a high frequency of accesses, the storage tier manager 106 can exchange the blocks of data with the blocks of data on the high performance storage device 116. The storage tier manager 106 can also identify the blocks of data incorrectly located on the high performance storage device 116 due to a low frequency of access and exchange the blocks of data with the low performance storage device 118. This exchange of the data blocks between the tier zero storage 120 and the tier one storage 122 can optimize the performance of the storage system 100.

The determination of which of the blocks of data should be exchanged between the tier zero storage 120 and the tier one storage 122 is controlled by the storage tier manager 106. The actual process of the exchange of the blocks of data between the tier zero storage 120 and the tier one storage 122 can be executed by the storage tier manager 106 and the storage media interface module 114 without interaction from the next level system (not shown).

It is understood that the storage system 100 having the tier zero storage 120 and the tier one storage 122 is an example only and any number of additional tiers of storage can be implemented. It is further understood that the array of the high performance storage device 116 shown in the tier zero storage 120 is an example only and any number of the high performance storage device 116 can be included in the array. Likewise the alternate array of the low performance storage device 118 in the tier one storage 122 is an example only and any number of the low performance storage device 118 can be included in the alternate array. It is further understood that the tier zero storage 120 and the tier one storage 122 can be any combination of solid state flash based memory or derivatives, phase change memory, volatile and non-volatile random access memory, rotating media, or serial tape streaming devices.

It has been discovered that the block level storage processor 102 can determine regions, within each of the tier zero storage 120 and the tier one storage 122, identified as having high priority attributes residing on the low performance storage device 118 and low priority attributes on the high performance storage device 116. The block level storage processor 102 can autonomously exchange the blocks of data between the tier zero storage 120 and the tier one storage 122 in order to improve the performance of the storage system 100. The storage tier manager 106 can maintain a prioritized table in internal memory or a private region of the storage media of these high and low priority regions for the purposes of deciding if they need to be exchanged based on user programmable or a default set of promotion policies.

Figure 2:
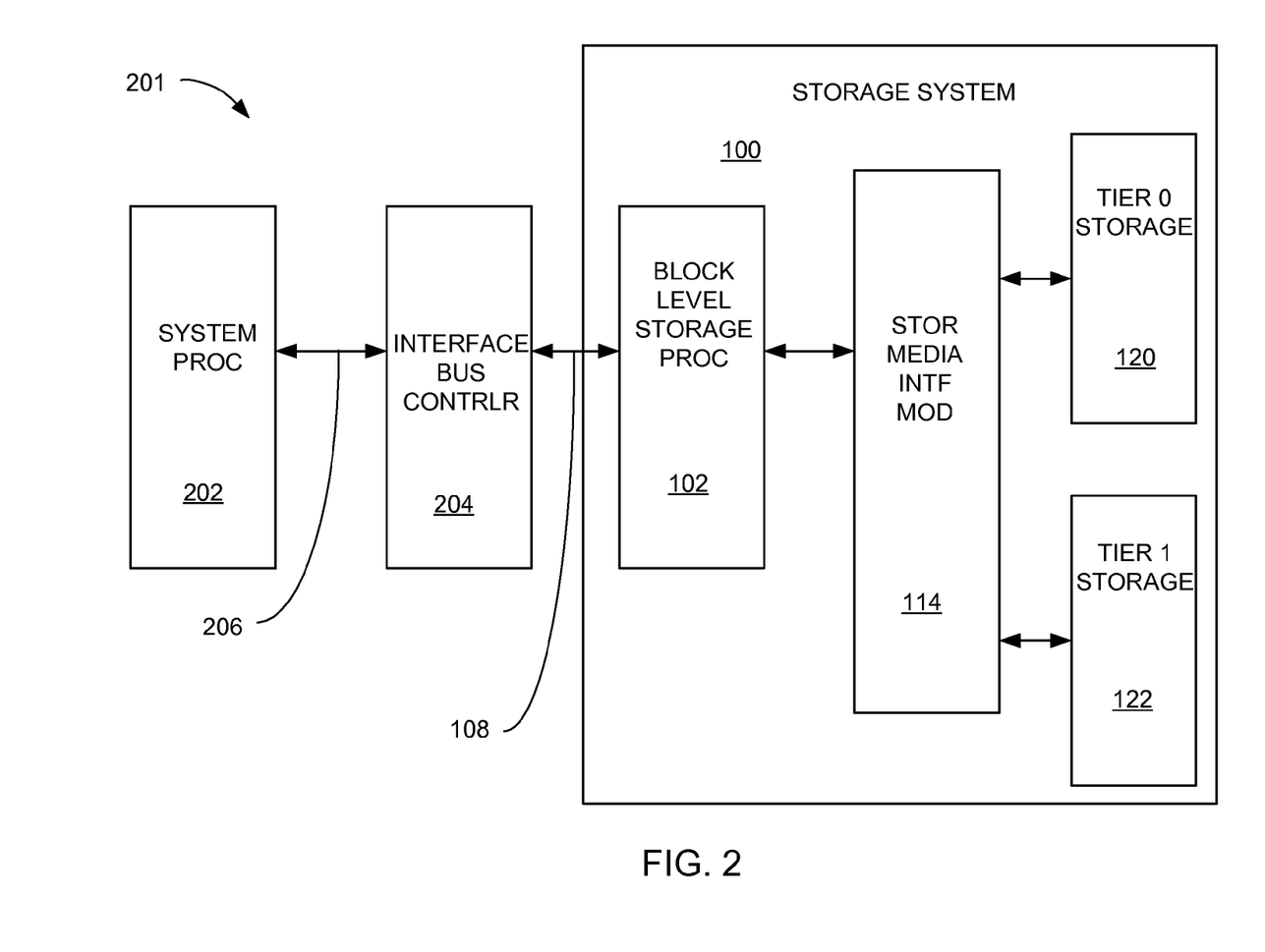
FIG. 2 is a block diagram of an example application of the storage system of FIG. 1.

Referring now to FIG. 2, therein is shown a block diagram of an example application 201 of the storage system 100 of FIG. 1. The block diagram of an example application 201 of the storage system 100 depicts a system processor 202 coupled to an interface bus controller 204 by a processor bus 206.

The interface bus controller 204 can drive the interface bus 108 in order to send and receive commands and data between the system processor 202 and the block level storage processor 102. The interface bus 108 can be a parallel bus, a serial bus, an electronic connection, an optical connection, or a wireless connection used to communicate with and deliver data between the block level storage processor 102 and the system processor 202.

The system processor 202 can access applications or data from the tier zero storage 120 or the tier one storage 122. The block level storage processor 102 can monitor the statistics of the blocks of data accessed by the system processor 202 to determine the proper priority of the blocks of data and whether an exchange of the blocks of data is required. The block level storage processor 102 can exchange the blocks of data between the tier zero storage 120 and the tier one storage 122 without the knowledge or assistance of the system processor 202.

If the block level storage processor 102 determines that the exchange of the blocks of data is required, the storage media interface module 114 can be set-up to perform the exchange while accesses by the system processor 202 continue unimpeded. The transfer of the blocks of data from, the tier zero storage 120 to the tier one storage 122 and vice versa, are executed by the block level storage processor 102 and the storage media interface module 114 without the knowledge or assistance of the system processor 202.

It has been discovered that the storage system 100 can improve the performance of the example application 201 by maintaining the most used of the blocks of data in the tier zero storage 120 and the least used of the blocks of data in the tier one storage 122. The exchange of the blocks of data between the tier zero storage 120 and the tier one storage 122 can be performed by the block level storage processor 102 and the storage media interface module 114 without adding any overhead or extra commands to the execution of the system processor 202.

Figure 3:
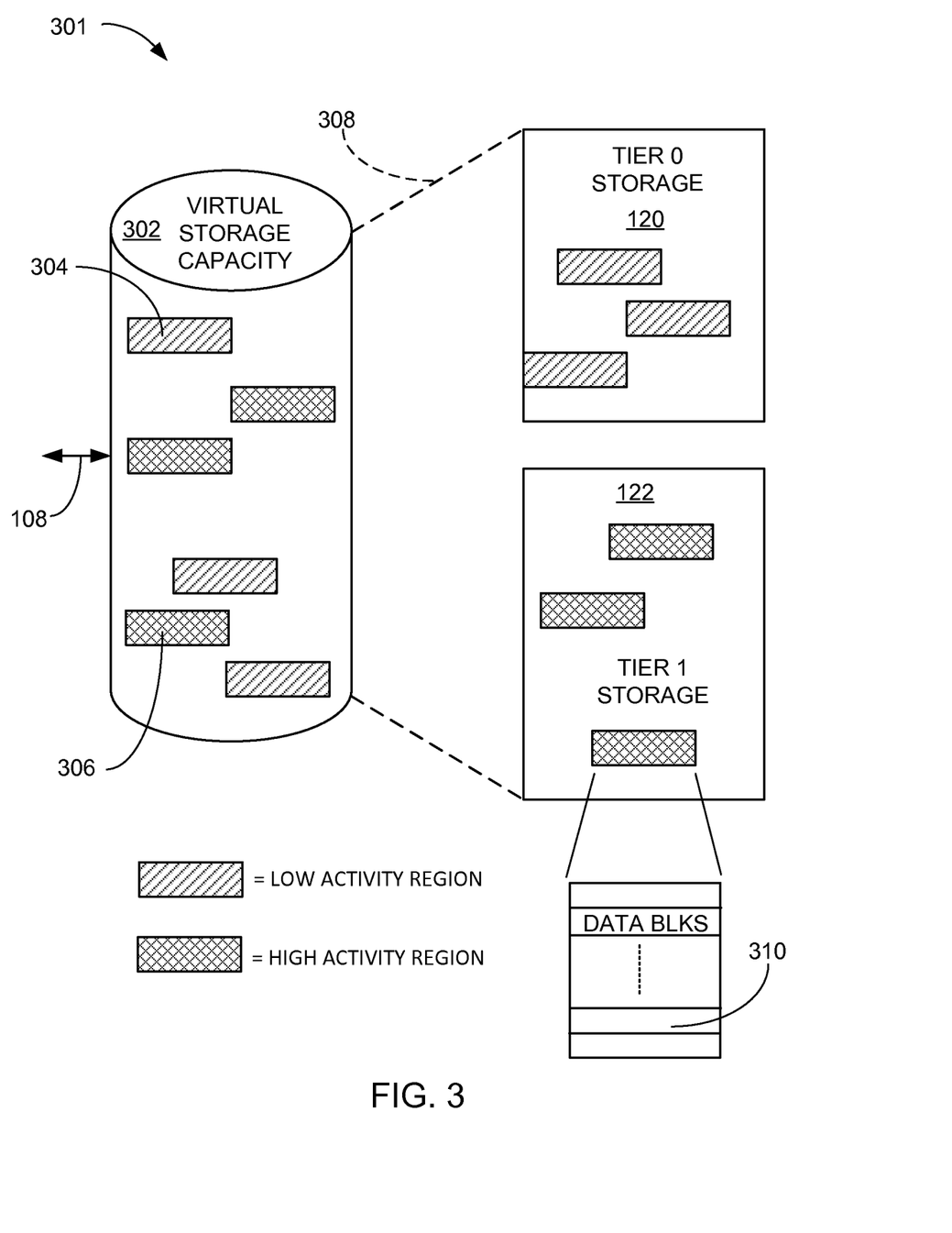
FIG. 3 is an exemplary block diagram of a virtual-to-physical translation for the storage system of FIG. 1.

Referring now to FIG. 3, therein is shown an exemplary block diagram of a virtual-to-physical translation 301 for the storage system 100 of FIG. 1. The exemplary block diagram of the virtual-to-physical translation 301 for the storage system 100 depicts a virtual storage capacity 302 having a low activity region 304, represented by a diagonal patterned rectangle, and a high activity region 306, represented by a crosshatch patterned rectangle, distributed therein.

A virtual-to-physical conversion 308 can be performed by the dynamic storage allocation module 107 of FIG. 1. The virtual storage capacity 302 can include all or a portion of the tier one storage 122 and all or a portion of the tier zero storage 120. The initial proportions and visible capacity of the tier zero storage 120 and the tier one storage 122 can be managed by default or user defined policies implemented by the dynamic storage allocation module 107.

In the initial writing of the low activity region 304 and the high activity region 306, their physical location may not reflect the proper priority. Any subsequent accesses of the low activity region 304 and the high activity region 306 can be monitored by the storage tier manager 106 of FIG. 1 in the form of usage statistics. The low activity region 304 represents a portion of the tier zero storage 120 that is least-frequently accessed, making the low activity region 304 a low priority data that is stored in the high priority and high performance space of the tier zero storage 120. The high activity region 306 represents a portion of the tier one storage 122 that is most-frequently accessed, making the high activity region 306 a high priority data that is stored in the low priority and low performance space of the tier one storage 122.

As the low activity region 304 and the high activity region 306 are accessed by the system processor 202, a priority can be determined by the storage tier manager 106. If the storage tier manager 106 determines that the tier zero storage 120 has been written with the low activity region 304 and the tier one storage 122 has been written with the high activity region 306, an exchange of blocks of data 310 can be scheduled for the storage media interface module 114 of FIG. 1 by the dynamic storage allocation module 107. The blocks of data 310 can be the content of the low activity region 304 or the high activity region 306.

The block level storage processor 102 can determine the priorities based on any number of criteria, for example most frequently accessed reads, reads and writes combined, streaming, or random access characteristics, and least frequently accessed reads. If the priority exceeds a predetermined threshold, the dynamic storage allocation module 107 can exchange the low activity region 304 in the tier zero storage 120 for the high activity region 306 in the tier one storage 122.

It is understood that the exchange of the low activity region 304 and the high activity region 306 can improve the performance of the high activity region 306 and make little difference to the availability of the low activity region 304. The dynamic storage allocation module 107 can coordinate the exchange of the low activity region 304 and the high activity region 306 while allowing the system processor 202 continue accessing to the high activity region 306. When the exchange is complete, the storage tier manager 106 can update the virtual-to-physical table to reflect the new physical locations without changing the virtual address for the system processor 202. In this way the change in physical location can occur without the system processor 202 being aware of the change in physical location of the low activity region 304 and the high activity region 306.

Figure 4:
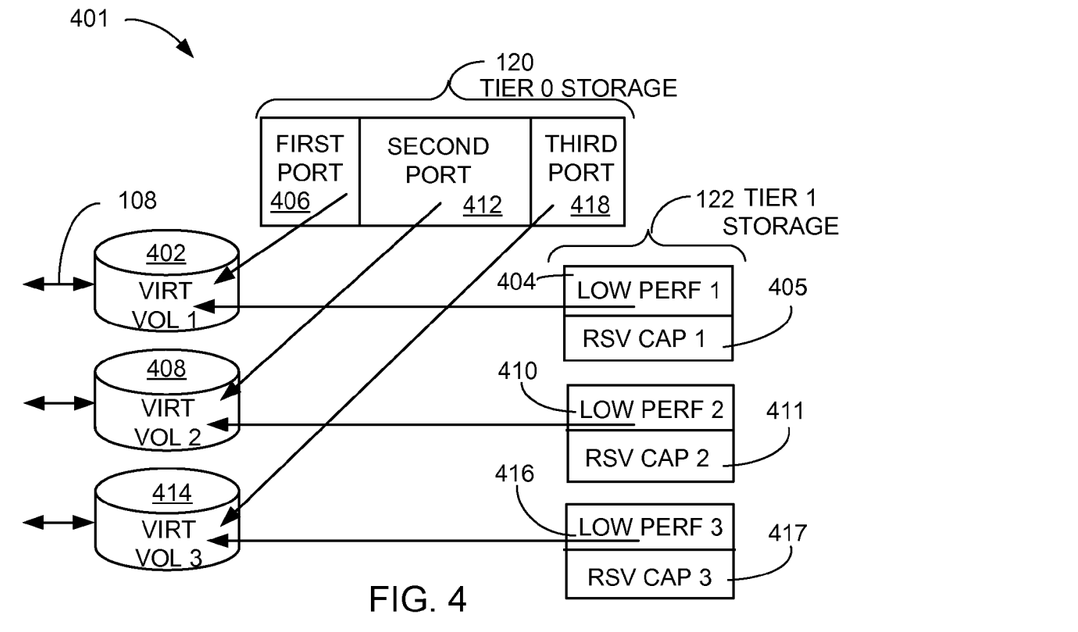
FIG. 4 is an architectural view of a multi-tier allocation of virtual disk volumes in the storage system of FIG. 1.

Referring now to FIG. 4, therein is shown an architectural view of a multi-tier allocation 401 of virtual disk volumes in the storage system 100 of FIG. 1. The architectural view of the multi-tier allocation 401 of virtual disk volumes depicts a first virtual disk volume 402, includes a first low performance storage capacity 404 and a first portion 406 of the tier zero storage 120.

The first portion 406 can include all of the capacity of the high performance storage device 116 of FIG. 1, some smaller percentage of it, or capacity from more than one of the high performance storage device 116. The initial capacity of the first virtual disk volume 402 can include a first reserved capacity 405 that is hidden from the system processor 202 of FIG. 2 coupled through the interface bus 108. The first reserved capacity 405 can be part of the first low performance storage capacity 404 or a hidden part of the first portion 406.

A second virtual disk volume 408 can include the capacity of a second low performance storage capacity 410 and a second portion 412 of the tier zero storage 120. The second portion 412 can include all of the capacity of a high performance storage device 116, some smaller percentage of it, or capacity from more than one of the high performance storage device 116. The initial capacity of the second virtual disk volume 410 can include a second reserved capacity 411 that is not visible to the system processor 202 coupled through the interface bus 108. The second reserved capacity 411 can be part of the second low performance storage capacity 410 or a hidden part of the second portion 412.

A third virtual disk volume 414 can include the capacity of a third low performance storage capacity 416 and a third portion 418 of the tier zero storage 120. The third portion 418 can include all of the capacity of a high performance storage device 116, some smaller percentage of it, or capacity from more than one of the high performance storage device 116. The initial capacity of the third virtual disk volume 414 can include a third reserved capacity 417 that is not visible to the system processor 202 that is coupled through the interface bus 108. The third reserved capacity 417 can be part of the third low performance storage capacity 416 or a hidden part of the third portion 418.

The combination of the first low performance storage capacity 404, the second low performance storage capacity 410, and the third low performance storage capacity 416 can represent all or only a portion of the low performance storage device 118 of FIG. 1 found in the tier one storage 122. Likewise the combination of the first portion 406, the second portion 412, and the third portion 418 can represent all or only a part of the tier zero storage 120. It is understood that the tier zero storage 120 and the tier one storage 122 can include a higher number of the high performance storage device 116 or the low performance storage device 118 of FIG. 1 than are shown. It is further understood that the interface bus 108 that is coupled to the first virtual disk volume 402 can be of a different type than the interface bus 108 coupled to the second virtual disk volume 408, or the third virtual disk volume 414.

It has been discovered that the storage system 100 provides the means for dynamically allocating additional capacity available to the system processor 202 without any action required from the system processor 202. The policies defined for the dynamic storage allocation module 107 of FIG. 1 can allow the storage tier manager 106 of FIG. 1 to update the virtual-to-physical table for the first virtual disk volume 402, the second virtual disk volume 408, or the third virtual disk volume 414 in order to make reserve capacity available for use. The policies can also have specific parameters or configurations that are presets for specific application types such as databases, virtual machines or other data intensive applications and can regulate the operation of the dynamic storage allocation module 107 for initial allocation of the first virtual disk volume 402, the second virtual disk volume 408, or the third virtual disk volume 414. It is understood that the number of the virtual disk volumes is an example only and any number of the virtual disk volumes can be supported, up to the maximum capacity of the tier zero storage 120, the tier one storage 122, and any additional tiers of storage that are available.

Figure 5:
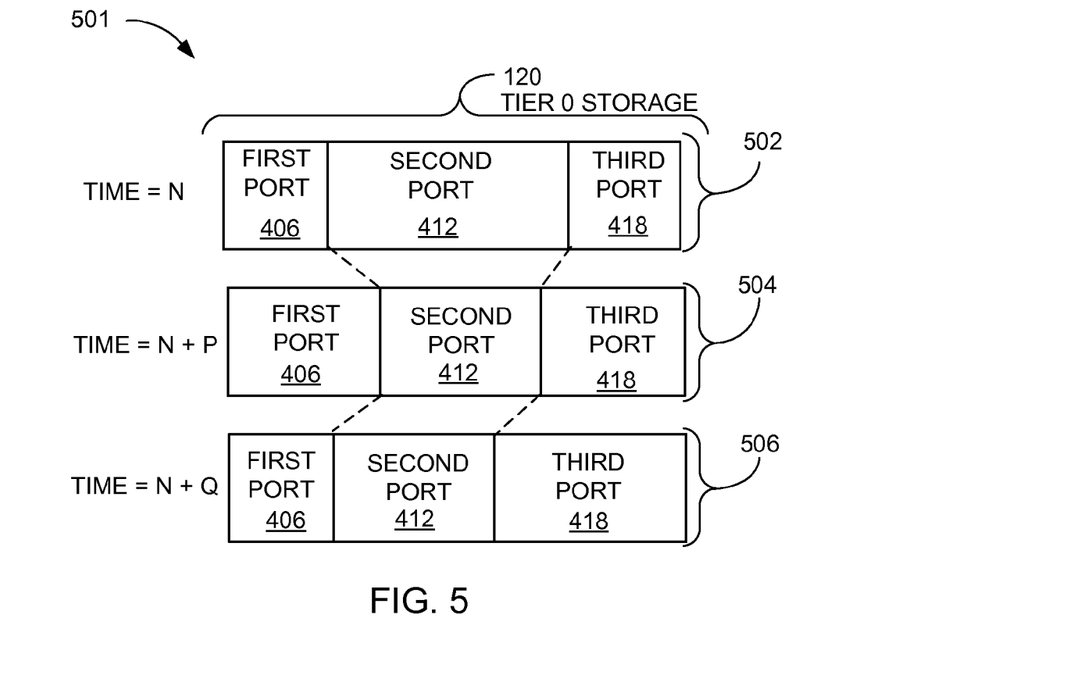
FIG. 5 is an architectural view of a dynamic allocation, over time, of the tier zero storage in the storage system of FIG. 1.

Referring now to FIG. 5, therein is shown an architectural view of a dynamic allocation 501, over time, of the tier zero storage 120 in the storage system 100 of FIG. 1. The architectural view of a dynamic allocation 501 depicts the tier zero storage 120 having the first portion 406, the second portion 412, and the third portion 418 in an initial allocation for the first virtual disk volume 402, the second virtual disk volume 408, and the third virtual disk volume 414 respectively at a time=N 502.

Due to the policies that manage the dynamic storage allocation module 107 of FIG. 1, the portions change over time based on the different activity levels of the first virtual disk volume 402, the second virtual disk volume 408, and the third virtual disk volume 414. At a time=N+P 504, the second portion 412 has reduced in capacity while both the first portion 406 and the third portion 418 have increased in capacity until the tier zero storage 120 is approximately evenly divided between the first portion 406, the second portion 412, and the third portion 418.

This reallocation of the capacity of the tier zero storage 120 is based on the activity levels of the first virtual disk volume 402, the second virtual disk volume 408, and the third virtual disk volume 414, and the policies for the dynamic storage allocation module 107 of FIG. 1 combined with the storage tier manager 106 of FIG. 1. The dynamic storage allocation module 107 utilizes the usage statistics of the storage tier manager 106 to determine that the activity levels, of the first virtual disk volume 402 and the third virtual disk volume 414, require a change in the amount of high performance storage allocated to the first portion 406 and the third portion 418 respectively.

The dynamic storage allocation module 107 can adjust the target allocation amounts for each of the first portion 406 and the third portion 418. As the amount of the tier zero storage 120 allocated to the second virtual disk volume 408 is reduced, there may still be valid data that exceeds the capacity of the new lower activity space allocated for the second portion 412.

In order to complete the change, the dynamic storage allocation module 107 will move sufficient data from the second portion 412 of the tier zero storage 120 to the tier one storage 122 to make room for the expansion of the first portion 406 and the third portion 418 of the tier zero storage 120. This transition may occur immediately or gradually over time depending on the usage statistics maintained by the storage tier manager 106.

As the time progresses to time=N+Q 506, the usage statistics maintained by the storage tier manager 106 can indicate that the activity level of the first virtual disk volume 402 has decreased, the activity of the second virtual disk volume 408 has remained constant, and the activity of the third virtual disk volume 414 has increased. The dynamic storage allocation module 107 can then reallocate the portions of the tier zero storage 120 to decrease the first portion 406, leave the second portion 412 unchanged, and increase the third portion 418.

Figure 6:
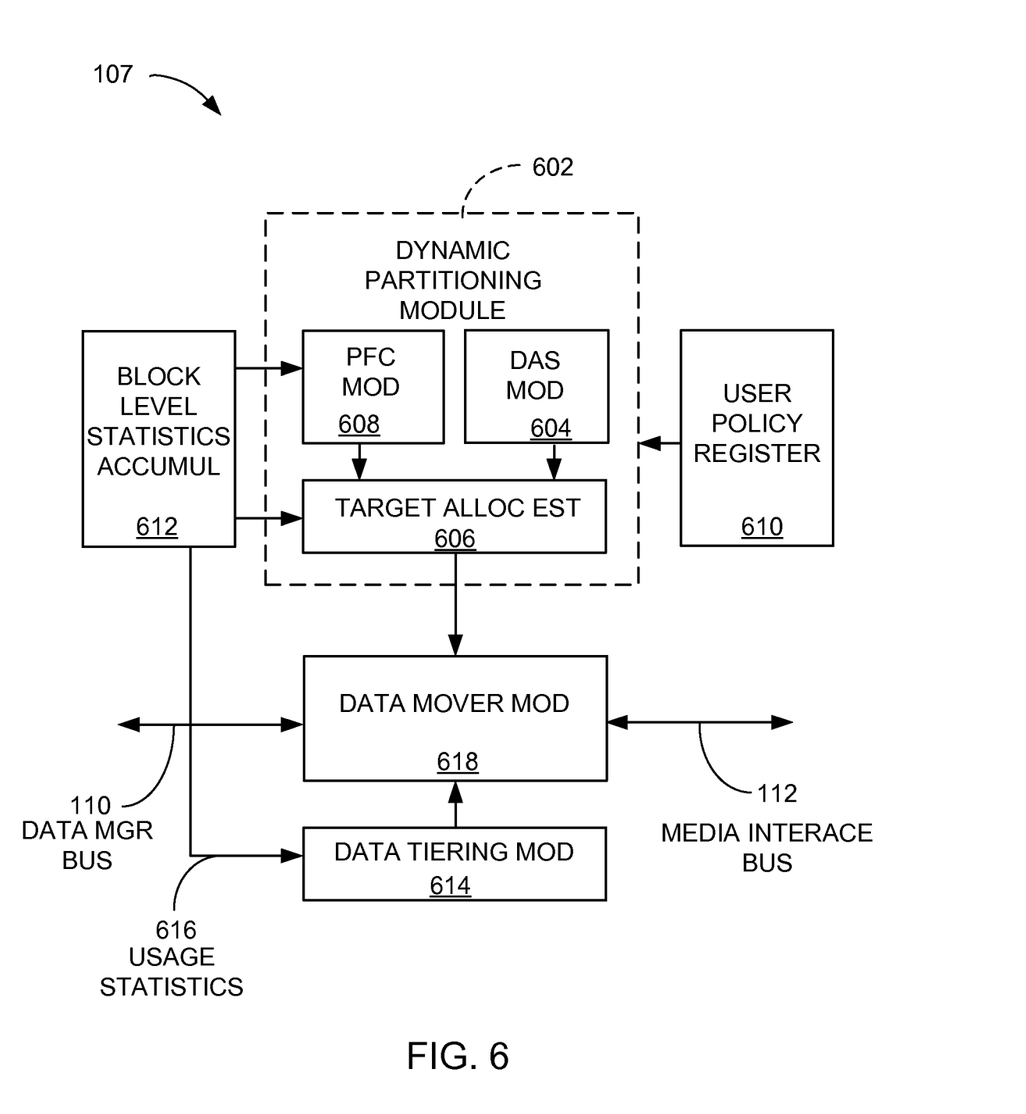
FIG. 6 is a functional block diagram of the dynamic storage allocation module of the storage system of FIG. 1.

Referring now to FIG. 6, therein is shown a functional block diagram of the dynamic storage allocation module 107 of the storage system 100 of FIG. 1. The functional block diagram of the dynamic storage allocation module 107 depicts a dynamic partitioning module 602 having a dynamic allocation setup module 604, a target allocation estimator module 606, and a partition fluidity control module 608.

The dynamic allocation setup module 604 can determine an initial partitioning of the tier zero storage 120 of FIG. 1 and any of the first reserved capacity 405 of FIG. 4, the second reserved capacity 411 of FIG. 4, or the third reserved capacity 417 in the tier zero storage 120 or the tier one storage 122 of FIG. 1. The dynamic allocation setup module 604 can receive input from a user policy register 610, which can be reset to reflect the system defaults. The default state of the user policy register 610 can provide an equal partition of the tier zero storage 120. The user policy register 610 can set-up a partition bias toward one or more of the first virtual disk volume 402 of FIG. 4, the second virtual disk volume 408 of FIG. 4, and third virtual disk volume 414 of FIG. 4. The user policy register 610 can also have specific parameters or configurations that are presets for specific application types such as databases, virtual machines or other data intensive applications that can establish criteria for the target allocation estimator module 606 and a data tiering module 614.

The target allocation estimator module 606 can receive input from the dynamic allocation setup module 604 in order to maintain the appropriate bias in the partition of the tier zero storage 120. The target allocation estimator module 606 can receive input from a block level statistics accumulator 612 and the partition fluidity control module 608. The target allocation estimator module 606 can be limited by the partition fluidity control module 608 to restrict the magnitude of increase or reduction in the allocation of the first portion 406 of FIG. 4 of the tier zero storage 120.

The block level statistics accumulator 612 can track the data activity trends, while the partition fluidity control module 608 can define the largest variation in the partition is allowed to change in a standard sample period. It will be understood that the partition fluidity control module 608 indicating a high degree of fluidity means that the selected partition of the tier zero storage 120 can make rapid changes in the partition size. Conversely, a low degree of fluidity can limit the maximum change in the size of the partition to a small percentage of the initial partition size.

The partition fluidity control module 608 can receive input from the block level statistics accumulator 612 in order to calculate the largest allowable change in the partition size for the sample period. The partition fluidity control module 608 can determine the frequency of updates to the partition size of the tier zero storage 120. A large change in the block level statistics accumulator 612 can invoke the data tiering module 614 in order to exchange a number of the blocks of data 310 of FIG. 3 between the tier zero storage 120 and the tier one storage 122 of FIG. 1 in order to utilize as much of the high performance partition as possible.

The data tiering module 614 can capture the usage statistics 616 identifying the low activity region 304 of FIG. 3 and the high activity region 306 of FIG. 3. The data tiering module 614 can exchange the low activity region 304 from the tier zero storage 120 with the high activity region 306 from the tier one storage 122. When the block level statistics accumulator 612 indicates a large change in the usage statistics 616, the data tiering module 614 can just transfer the low activity region 304 out of the tier zero storage 120 to the first reserved capacity 405 of FIG. 4 in order to reserve as much space as possible in the tier zero storage 120. The blocks of data 310 within the low activity region 304 can be tagged to be moved to the first reserved capacity 405 in the tier one storage 122. The physical location of the blocks of data 310 within the low activity region 304 can be updated in the virtual-to-physical table maintained by the storage tier manager 106 of FIG. 1.

A data mover module 618 can execute the exchange of the low activity region 304 from the tier zero storage 120 and the high activity region 306 from the tier one storage 122. In the event of large changes in the usage statistics 616, the data mover module 618 can move the low activity region 304 from the tier zero storage 120 into the first reserved capacity 405 in order to provide reserved space in the tier zero storage 120 or just clear some of the partition of the tier zero storage 120 in preparation for increased data activity. The data mover module 618 can be coupled to the storage media interface module 114 of FIG. 1 by the media interface bus 112. The data mover module 618 can also be coupled to the bus driver interface module 104 of FIG. 1 by the data manager bus 110. The data mover module 618 can be the center of all data movement between the first virtual disk volume 402 and the system processor 202.

By way of an example, the dynamic allocation setup module 604 can receive input from the user policy register 610 in order to establish the first portion 406 of the tier zero storage 120 that can be incorporated in the first virtual disk volume 402. The first portion 406 can be configured as either visible, invisible, or a combination thereof to the system processor 202 of FIG. 2. The first low performance storage capacity 404 can also be configured with the first reserved capacity 405 for future expansion and temporary storage of the blocks of data 310 that can be moved from the first portion 406. The first reserved capacity 405 configured in the first low performance storage capacity 404 can be configured as either visible, invisible, or a combination thereof to the system processor 202.

The dynamic configuration module 602 can apply automatic allocation updates for the first virtual disk volume 402, the second virtual disk volume 408, and third virtual disk volume 414 based on the usage statistics 616 and the content of the user policy register 610. The system processor 202 is not involved or aware of the dynamic changes in the allocation of the partitions of the tier zero storage 120 or the tier one storage 122.

It has been discovered that by establishing the initial partitions of the first virtual disk volume 402, the second virtual disk volume 408, and third virtual disk volume 414 based on the user defined preferences loaded in the user policy register 610 and managing the changes to the allocation based on the usage statistics 616, the memory system 100 can dynamically share and load balance capacity of one or more of the high performance storage device 116 of FIG. 1 with one or more of the low performance storage device 118 of FIG. 1 in a tiered storage configuration. The storage system 100 can utilize the first reserved capacity 405 in the tier zero storage 120 or the tier one storage 122 to manage capacity fluctuations based on the usage statistics 616 constrained by the partition fluidity control module 608.

Figure 7:
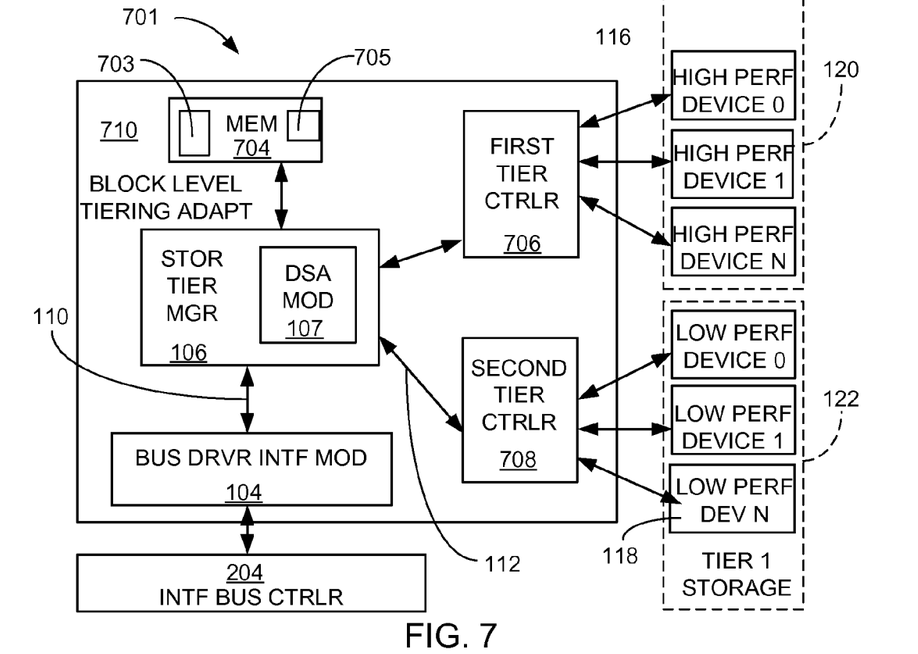
FIG. 7 is a functional block diagram of a host bus adapter implementation of the storage system of FIG. 1.

Referring now to FIG. 7, therein is shown a functional block diagram of a host bus adapter implementation 701 of the storage system 100 of FIG. 1. The functional block diagram of the host bus adapter implementation 701 depicts a storage tier manager 106 which keeps usage statistics 703, for the tier zero storage 120 and the tier one storage 122, in a memory device 704. The storage tier manager 106 can monitor the media interface bus 112 for each access to the tier zero storage 120 and the tier one storage 122 for generating the usage statistics 703. The usage statistics 703 can be evaluated based on the priorities established for determining the low activity region 304 of FIG. 3 and the high activity region 306 of FIG. 3.

The memory device 704 can be a discrete memory component or an embedded memory component in the storage tier manager 106. The implementation of the storage tier manager 106 and the memory device 704 can operate in the same fashion as the storage tier manager 106 with an embedded instance of the memory device 704.

The storage tier manager 106 can perform a virtual-to-physical mapping function, which is employed to map the multiple physical devices into the virtual storage capacity 302 of FIG. 3 that is presented to and accessed by the system processor 202 of FIG. 2. A virtual-to-physical table 705 can be maintained in the memory device 704 the low activity region 304 and the high activity region 306 that are determined from the usage statistics 703.

The storage tier manager 106 can be coupled to a first tier controller 706 and a second tier controller 708. The combination of the first tier controller 706, the second tier controller 708, and the storage tier manager 106 can provide the function of the storage media interface module 114 of FIG. 1. In order to maintain a load balance across the first virtual disk volume 402 of FIG. 4, the second virtual disk volume 408 of FIG. 4, and third virtual disk volume 414 of FIG. 4, the storage tier manager 106 can utilize the dynamic storage allocation module 107 to coordinate the movement of the low activity region 304 of FIG. 3 and the high activity region 306 of FIG. 3 through the first tier controller 706 and the second tier controller 708.

The first tier controller 706 can be coupled to the tier zero storage 120, which is composed of a number of the high performance storage device 116. The high performance storage device 116 can include semiconductor based solid state drives (SSD), very high performance magnetic disks such as serial attached small computer system interface (SAS) disk drives rotating at 10,000-15,000 RPM. The first tier controller 706 can be coupled to the individual units of the high performance storage device 116 as shown or it can be coupled through a single high performance interface, such as an optical interface, to an enclosure (not shown) that houses the tier zero storage 120.

The second tier controller 708 can be coupled to the tier one storage 122, which is composed of the low performance storage device 118. The low performance storage device 118 can include a serial advanced technology attachment (SATA) drive, a network attached storage (NAS), or a serial attached small computer system interface (SAS) disk drives rotating at 7200 RPM. The second tier controller 708 can be coupled to the individual units of the low performance storage device 118 as shown or it can be coupled through a single high performance interface, such as an optical interface, to an enclosure (not shown) that houses the tier one storage 122.

The storage tier manager 106 can be coupled, by the data manager bus 110, to the bus driver interface module 104 for communicating with the system processor 202 of FIG. 2 through the interface bus controller 204. It is understood that the interface bus controller 204 can include attachment hardware and electronics required to allow the insertion of a block level tiering adapter 710 composed of the storage tier manager 106, the memory device 704, the first tier controller 706, the second tier controller 708, and the bus driver interface module 104 mounted on a pluggable printed circuit board.

It has been discovered that the storage system 100 can be implemented as the block level tiering adapter 710 coupled to the tier zero storage 120 and the tier one storage 122. The implementation of the block level tiering adapter 710 can provide an upgrade path to include the storage system 100 to an existing computer system (not shown) with no modifications required to the existing computer system. During the operation of the block level tiering adapter 710, the storage tier manager 106 can keep usage statistics 703 of the high activity region 306 and the low activity region 304. The storage tier manager 106 can keep the usage statistics 703 in the memory device 704. The dynamic storage allocation module 107 can dynamically share and load balance capacity of one or more of the high performance storage device 116 of FIG. 1 with one or more of the low performance storage device 118 of FIG. 1 in a tiered storage configuration.

Figure 8:
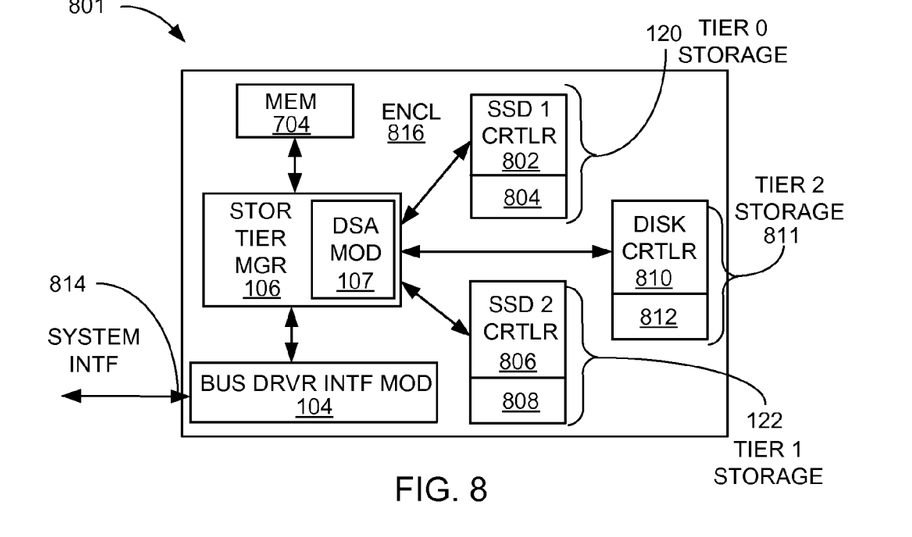
FIG. 8 is a functional block diagram of a network attached implementation of the storage system.

Referring now to FIG. 8, therein is shown a functional block diagram of a network attached implementation 801 of the storage system 100 of FIG. 1. The functional block diagram of the network attached implementation 801 depicts the storage tier manager 106 coupled to the memory device 704. The storage tier manager 106 can be coupled to a first solid state drive controller 802 coupled to a first storage array 804 such as an array of single level code (SLC) NAND flash devices or phase change memory (PCM) devices.

The storage tier manager 106 can also be coupled to a second solid state drive controller 806. The second solid state drive controller 806 can be coupled to a second storage array 808 such as an array of multi-level code (MLC) NAND flash devices, which is of lower performance than the first storage array 804.

The storage tier manager 106 can also be coupled to a disk media controller 810 configured as a tier two storage 811 of the disk array 812. The dynamic storage allocation module 107 can manage the tier zero storage 120, the tier one storage 122, and the tier two storage 811 in order to dynamically share and load balance capacity of the first storage array 804, the second storage array 808, and the disk array 812 in a tiered storage configuration. The tier two storage 811 can be formed of a very low performance storage device capable of less than 100 IOPS in the disk array 812.

The storage tier manager 106 can be coupled to the bus driver interface module 104 for communicating with the next level system (not shown). The bus driver interface module 104 can support a system interface 814 such as a serial optical interface or a serial electrical interface. The system interface 814 can include a serial attached SCSI (SAS), Serial advanced technology attachment (SATA), peripheral component interconnect express (PCI-e), Thunderbolt™ interface, or combinations thereof for communicating with the next level system.

An enclosure 816 can house the storage tier manager 106, the memory device 704, the first solid state drive controller 802, the first storage array 804, the second solid state drive controller 806, the second storage array 808, and the bus driver interface module 104 mounted on a printed circuit board with power supplies, fans and connectors (not shown). The enclosure 816 can be a wristwatch-sized container, a pocket-sized container, a standardized rack electronic enclosure, or a building that can house the storage system 100.

Figure 9:
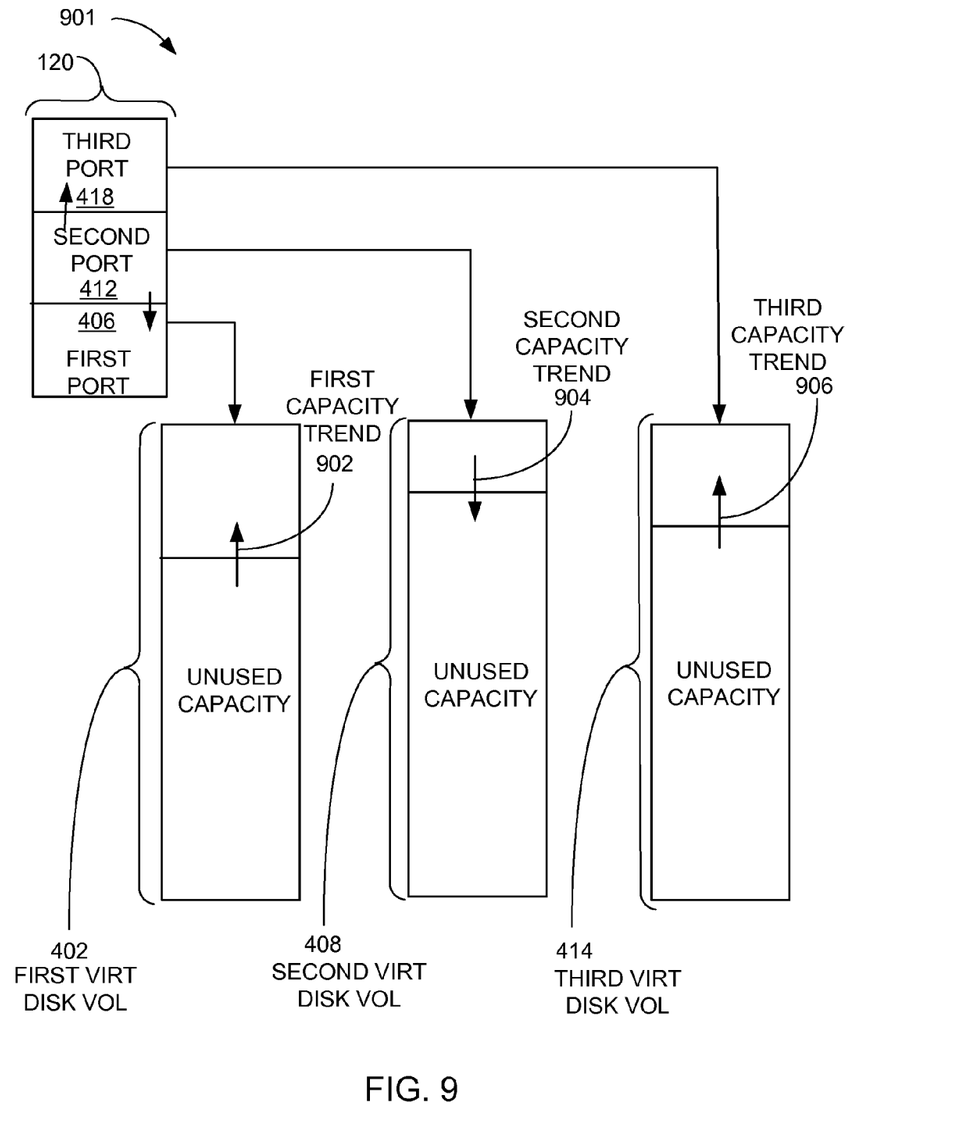
FIG. 9 is an architectural view of a dynamic allocation of the virtual volumes of the storage system of FIG. 1.

Referring now to FIG. 9, therein is shown an architectural view of a dynamic allocation 901 of the virtual volumes of the storage system 100 of FIG. 1. The architectural view of the dynamic allocation 901 depicts the first virtual disk volume 402, the second virtual disk volume 408, and third virtual disk volume 414 each having a dynamic capacity.

By way of an example, the first virtual disk volume 402 can have a first trend line 902 that can be calculated by the target allocation estimator module 606 of FIG. 6 in response to the usage statistics 616 of FIG. 6 as limited by the partition fluidity control module 608 of FIG. 6. The first trend line 902 can indicate that the first portion 406 will be reduced in size on the update. The overall capacity of the first virtual disk volume 402 can remain constant as viewed by the system processor 202 while the percentage of the first virtual disk volume 402 that represents the first portion 406 can be exchanged for hidden capacity from the low performance storage device 118 of FIG. 1.

This approach allows the storage system 100 to optimize the performance of the first virtual disk volume 402, the second virtual disk volume 408, and third virtual disk volume 414 while sharing the tier zero storage 120 among all of the virtual disk volumes. It is understood that the second trend line 904 and the third trend line 906 operate in a similar fashion to the first trend line 902.

Figure 10:
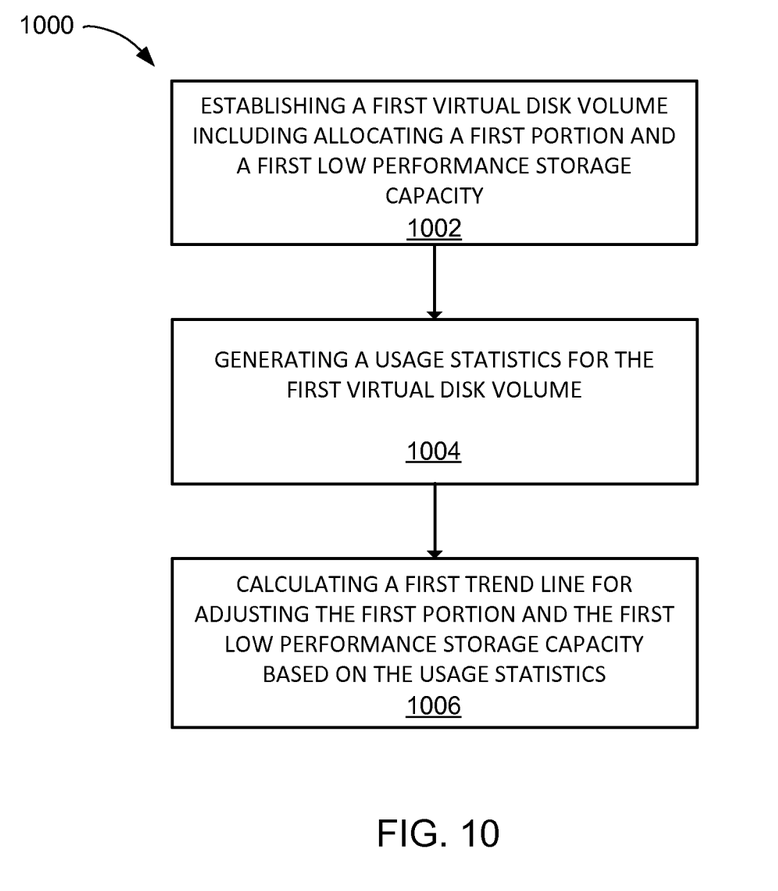
FIG. 10 is a flow chart of the method of operation of a storage system in an embodiment of the present invention.

Referring now to FIG. 10, therein is shown a flow chart of a method 1000 of operation of a storage system 100 in an embodiment of the present invention. The method 1000 includes: establishing a first virtual disk volume including allocating a first portion and a first low performance storage capacity in a block 1002; generating a usage statistics for the first virtual disk volume in a block 1004; and calculating a first trend line for adjusting the first portion and the first low performance storage capacity based on the usage statistics in a block 1006.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a storage system comprising:
establishing a first virtual disk volume including allocating a first portion and a first low performance storage capacity;
generating a usage statistics for the first virtual disk volume; and
calculating a first trend line for adjusting the first portion and the first low performance storage capacity based on the usage statistics.

2. The method as claimed in claim 1 wherein adjusting the first portion and the first low performance storage capacity includes updating a virtual-to-physical table for transferring a low activity region from the first portion to the first low performance storage capacity.

3. The method as claimed in claim 1 further comprising load balancing a second portion of a tier zero storage with the first portion based on the usage statistics.

4. The method as claimed in claim 1 wherein calculating the first trend line includes tagging a low activity region for moving to a first reserved capacity in the first low performance storage capacity.

5. The method as claimed in claim 1 wherein adjusting the first portion and the first low performance storage capacity includes limiting the first trend line by controlling a maximum change in a first reserved capacity distributed between the first portion and the first low performance storage capacity.

6. A method of operation of a storage system comprising:
establishing a first virtual disk volume including allocating a first portion in a tier zero storage and a first low performance storage capacity in a tier one storage;
generating a usage statistics for the first virtual disk volume including monitoring a media interface bus; and
calculating a first trend line for adjusting the first portion and the first low performance storage capacity based on the usage statistics includes restricting, by a partition fluidity control module, a magnitude of the first trend line.

7. The method as claimed in claim 6 wherein adjusting the first portion and the first low performance storage capacity includes transferring a low activity region from the first portion to a first reserved capacity in the first low performance storage capacity.

8. The method as claimed in claim 6 further comprising load balancing a second portion of a tier zero storage with the first portion based on the usage statistics including transferring a second reserved capacity to the second portion and transferring a first reserved capacity to the first low performance storage capacity.

9. The method as claimed in claim 6 wherein calculating the first trend line includes tagging a low activity region for moving to a first reserved capacity in the first low performance storage capacity including updating a virtual-to-physical table.

10. The method as claimed in claim 6 wherein adjusting the first portion and the first low performance storage capacity includes limiting the trend line by controlling a maximum change in a first reserved capacity distributed between the first portion and the first low performance storage capacity and applying a user policy.

11. A storage system comprising:
a tier zero storage;
a first portion allocated from the tier zero storage;
a tier one storage joined with the tier zero storage for forming a first virtual disk volume including the first portion and a first low performance storage capacity;
a data mover module coupled to the tier zero storage and the tier one storage for generating a usage statistics for the first virtual disk volume; and
a target allocation estimator module coupled to the data mover module for calculating a first trend line and adjusting the first portion and the first low performance storage capacity based on the usage statistics.

12. The system as claimed in claim 11 wherein the data mover module updated a virtual-to-physical table for transferring a low activity region from the first portion to the first low performance storage capacity.

13. The system as claimed in claim 11 further comprising a memory device, coupled to a block level statistics accumulator, for updating the usage statistics.

14. The system as claimed in claim 11 wherein the target allocation estimator module, coupled to the data mover module, for calculating a first trend line includes a partition fluidity control module coupled to the target allocation estimator module for limiting the first trend line.

15. The system as claimed in claim 11 wherein the target allocation estimator module adjusted the first portion and the first low performance storage capacity based on the usage statistics includes:
a dynamic allocation setup module coupled to the target allocation estimator module for determining an initial value of the first portion and the first low performance storage capacity; and
a partition fluidity control module coupled to the target allocation estimator module for limiting the first trend line.

16. The system as claimed in claim 11 further comprising:
a media interface bus, coupled to the data mover module, monitored for generating the usage statistics; and
a partition fluidity control module, coupled to the target allocation estimator module, for restricting the trend line.

17. The system as claimed in claim 16 wherein the data mover module updated a virtual-to-physical table for transferring a low activity region from the first portion to the first low performance storage capacity includes a data tiering module or the target allocation estimator module in control of the transfer.

18. The system as claimed in claim 16 further comprising a memory device, coupled to a block level statistics accumulator, for updating the usage statistics and a virtual-to-physical table.

19. The system as claimed in claim 16 wherein the target allocation estimator module is for calculating a first trend line includes a partition fluidity control module coupled to the target allocation estimator module for limiting the first trend line.

20. The system as claimed in claim 16 wherein the target allocation estimator module adjusted the first portion and the first low performance storage capacity based on the usage statistics includes:
a dynamic allocation setup module coupled to the target allocation estimator module for determining an initial value of the first portion and the first low performance storage capacity includes a user policy register coupled to the dynamic allocation setup module; and
a partition fluidity control module coupled to the target allocation estimator module for limiting the first trend line includes a block level statistics accumulator coupled to the partition fluidity control module.

21. A non-transitory computer readable media comprising:
establishing a first virtual disk volume including allocating a first portion and a first low performance storage capacity;
generating a usage statistics for the first virtual disk volume; and
calculating a first trend line for adjusting the first portion and the first low performance storage capacity based on the usage statistics.

22. The non-transitory computer readable media as claimed in claim 21 wherein adjusting the first portion and the first low performance storage capacity includes updating a virtual-to-physical table for transferring a low activity region from the first portion to the first low performance storage capacity.

23. The non-transitory computer readable media as claimed in claim 21 further comprising load balancing a second portion of a tier zero storage with the first portion based on the usage statistics.

24. The non-transitory computer readable media as claimed in claim 21 wherein calculating the first trend line includes tagging a low activity region for moving to a first reserved capacity in the first low performance storage capacity.

25. The non-transitory computer readable media as claimed in claim 21 wherein adjusting the first portion and the first low performance storage capacity includes limiting the first trend line by controlling a maximum change in a first reserved capacity distributed between the first portion and the first low performance storage capacity.

* * * * *